US010458383B2

(12) United States Patent
Boete

(10) Patent No.: US 10,458,383 B2
(45) Date of Patent: Oct. 29, 2019

(54) DRIVE SYSTEM FOR AN ENGINE ARRANGEMENT

(71) Applicant: VOLVO TRUCK CORPORATION, Göteborg (SE)

(72) Inventor: Yann Boete, Lyons (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/735,962

(22) PCT Filed: Jul. 29, 2015

(86) PCT No.: PCT/IB2015/001819
§ 371 (c)(1),
(2) Date: Dec. 13, 2017

(87) PCT Pub. No.: WO2017/017492
PCT Pub. Date: Feb. 2, 2017

(65) Prior Publication Data
US 2018/0209392 A1 Jul. 26, 2018

(51) Int. Cl.
*F02N 15/00* (2006.01)
*F02N 15/04* (2006.01)
(Continued)

(52) U.S. Cl.
CPC ............ *F02N 15/046* (2013.01); *B60K 17/00* (2013.01); *B60K 25/02* (2013.01); *F02B 67/06* (2013.01);
(Continued)

(58) Field of Classification Search
CPC ...... F02N 15/046; F02N 15/022; F02N 15/08; F02N 15/06; F02N 11/0814; F02N 11/00;
(Continued)

(56) References Cited

U.S. PATENT DOCUMENTS

| 4,909,364 | A | 3/1990 | Grimm | |
|---|---|---|---|---|
| 2011/0319214 | A1* | 12/2011 | Showalter | ............... F02N 11/04 475/149 |
| 2013/0029800 | A1* | 1/2013 | Langbein | .................. F16H 3/54 475/343 |

FOREIGN PATENT DOCUMENTS

| CN | 1118186 A | 3/1996 |
|---|---|---|
| CN | 1139474 A | 1/1997 |

(Continued)

OTHER PUBLICATIONS

International Search Report (May 11, 2016) for corresponding International App. PCT/IB2015/001819.

(Continued)

*Primary Examiner* — Hai H Huynh
(74) *Attorney, Agent, or Firm* — Venable LLP; Jeffri A. Kaminski

(57) ABSTRACT

A drive system is provided for an engine arrangement, which includes a gear reduction mechanism such as an epicyclic gearing including first junction element connected to an engine crankshaft, second junction element connected to an accessory pulley which is drivingly connected to an electric machine and at least one accessory, and third junction element. A free wheel is connected to a non-rotating part of the engine arrangement. In a first operating phase of the drive system, the free wheel is coupled to the third junction element and is configured such that when the third junction element exerts torque on the free wheel in one direction, the free wheel is in an engaged state and stops the rotation of the third junction element, and, when the third junction element exerts torque on the free wheel in the opposite direction, the free wheel is in a free state and allows rotation of the third junction element.

19 Claims, 4 Drawing Sheets

(51) Int. Cl.
- *B60K 17/00* (2006.01)
- *F02N 11/08* (2006.01)
- *F02N 15/02* (2006.01)
- *F02B 67/06* (2006.01)
- *F16D 11/14* (2006.01)
- *B60K 25/02* (2006.01)
- *F16H 3/54* (2006.01)
- *F16D 11/10* (2006.01)
- F02N 11/00 (2006.01)
- F02N 11/04 (2006.01)
- F02N 15/06 (2006.01)
- F02N 15/08 (2006.01)
- F16D 11/00 (2006.01)
- B60K 25/00 (2006.01)
- F16H 63/32 (2006.01)
- F16H 63/30 (2006.01)

(52) U.S. Cl.
CPC ........ *F02N 11/0814* (2013.01); *F02N 15/022* (2013.01); *F16D 11/10* (2013.01); *F16D 11/14* (2013.01); *F16H 3/54* (2013.01); *B60K 2025/005* (2013.01); *B60K 2025/022* (2013.01); *B60K 2025/024* (2013.01); *F02N 11/00* (2013.01); *F02N 11/04* (2013.01); *F02N 15/06* (2013.01); *F02N 15/08* (2013.01); *F02N 2300/2002* (2013.01); *F16D 2011/002* (2013.01); *F16H 63/32* (2013.01); *F16H 2063/3093* (2013.01); *F16H 2063/325* (2013.01); *F16H 2200/0034* (2013.01); *F16H 2200/2005* (2013.01); *F16H 2200/2035* (2013.01); *F16H 2200/2064* (2013.01); *F16H 2200/2066* (2013.01); *F16H 2200/2082* (2013.01); *F16H 2200/2094* (2013.01); *Y02T 10/48* (2013.01)

(58) Field of Classification Search
CPC .. F02N 11/04; F02N 2300/2002; F16D 11/10; F16D 11/14; F16D 2011/002; B60K 25/02; B60K 17/00; B60K 2025/022; B60K 2025/024; B60K 2025/005; F16H 3/54; F16H 2063/3093; F16H 2063/325; F16H 63/32; F16H 2200/2005; F16H 2200/0034; F16H 2200/2082; F16H 2200/2064; F16H 2200/2094; F16H 2200/2035; F16H 2200/2066; F02B 67/06; Y02T 10/48
USPC .......................................... 123/179.25, 185.1
See application file for complete search history.

(56) References Cited

FOREIGN PATENT DOCUMENTS

| CN | 2646327 Y | 10/2004 |
|---|---|---|
| CN | 106232931 A | 12/2016 |
| DE | 10049614 B4 | 9/2005 |
| DE | 10049793 B4 | 9/2009 |
| DE | 102011010088 A1 | 8/2012 |
| EP | 1455085 A2 | 9/2004 |
| WO | 2009121188 A1 | 10/2009 |

OTHER PUBLICATIONS

Chinese Official Action (Feb. 3, 2019) for corresponding Chinese App. 201580081525.5.

* cited by examiner

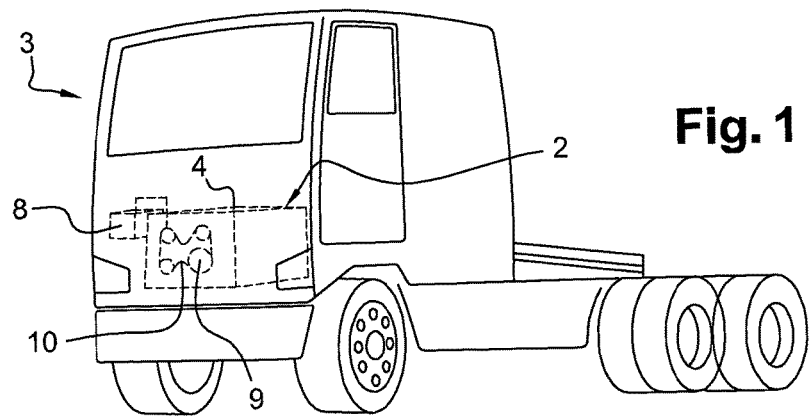
Fig. 1
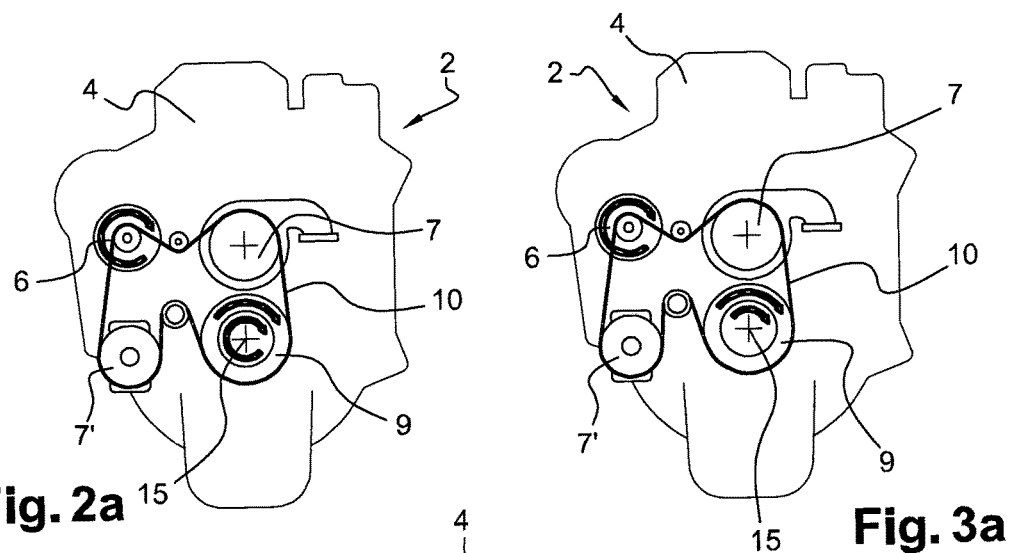
Fig. 2a
Fig. 3a
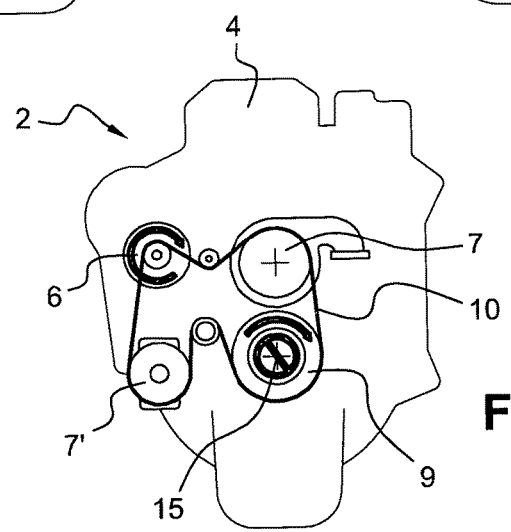
Fig. 4a

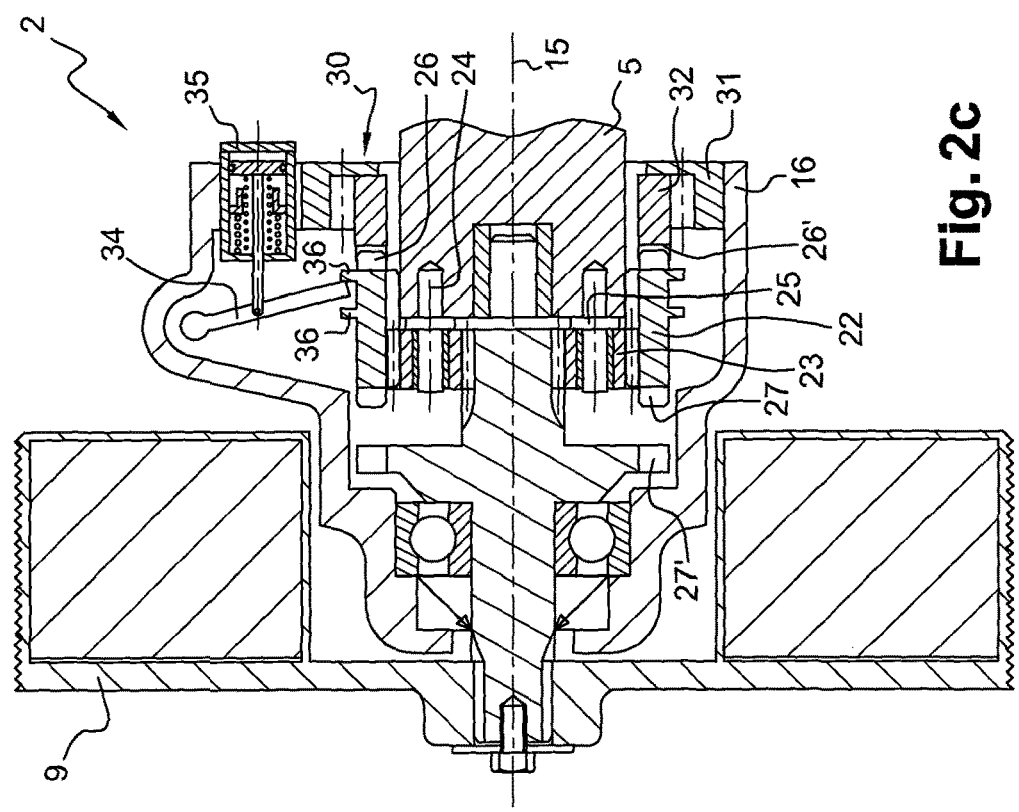
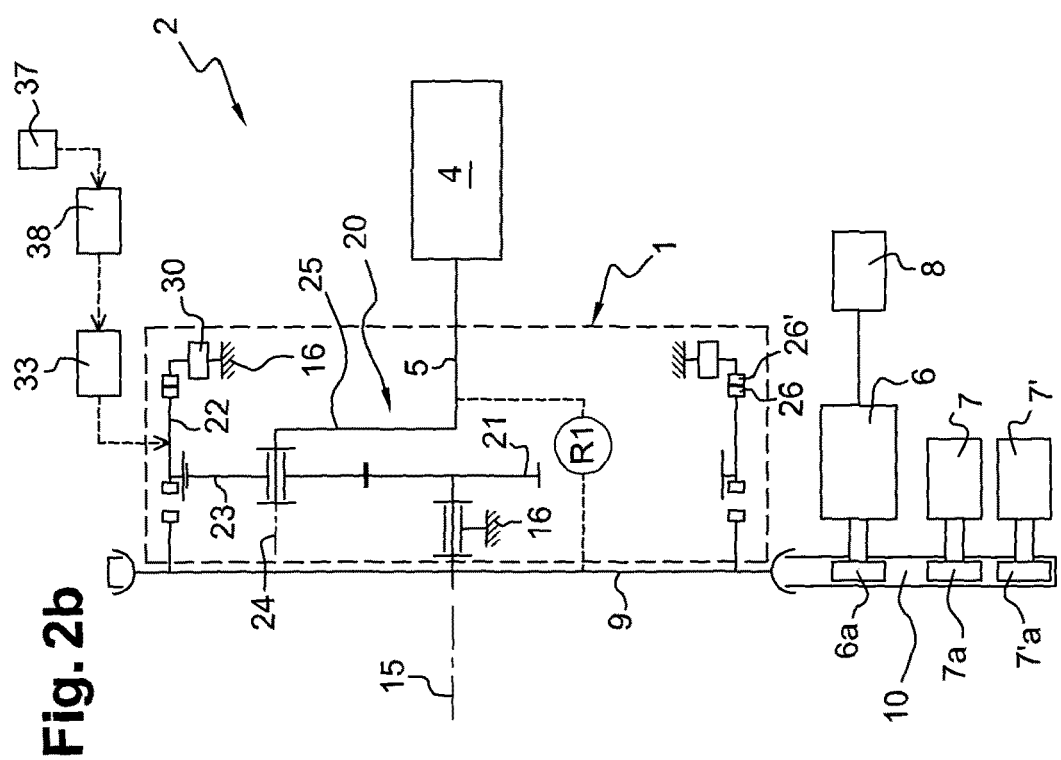

DRIVE SYSTEM FOR AN ENGINE ARRANGEMENT

BACKGROUND AND SUMMARY

The invention relates to a drive system for an engine arrangement, an engine arrangement including such a drive system, a vehicle comprises such an engine arrangement, and a method for operating such an engine arrangement.

The invention can be applied in medium and heavy-duty vehicles, such as trucks, buses and construction equipment.

In order to decrease fuel consumption, engine arrangements have been developed that automatically stop an engine when the engine power is not needed—for example at a traffic light or in a traffic jam, when the driver depresses the brake pedal—and restarts the engine in response to a signal—typically when the driver actuates the accelerator pedal.

Such an engine arrangement comprises the engine, an electric machine, one or several accessories, and an accessory pulley to which the electric machine and the accessory (ies) are drivingly connected. A drive system comprising a gear reduction mechanism is used to join the accessory pulley and an engine crankshaft.

The engine arrangement can be in one of:

a starting phase, in which the electric machine, powered by a battery, starts the engine;

a running phase (i.e. normal driving conditions), in which the engine is running, drives the accessory, and drives the electric machine so that said electric machine can charge the battery;

and an electric phase, in which the engine is stopped and the electric machine drives the accessory.

The drive system is designed to allow the engine arrangement to be operated in any of these three phases, and to allow for transition between these three phases.

Although conventional drive systems are generally satisfactory, room for improvement remains.

It is desirable to provide an improved drive system for an engine arrangement.

More specifically, it is desirable to provide such a drive system which allows smoother transition between at least two operating phases of the engine.

According to a first aspect, the invention relates to a drive system for an engine arrangement, the drive system comprising a gear reduction mechanism having at least three separate and rotatable junction elements, the rotation speeds of the junction elements being interdependent but not having a fixed ratio the ones relative to the others, and wherein, in the mounted position, among said junction elements:

a first junction element is connected to an engine crankshaft;

a second junction element is connected to an accessory pulley which is drivingly connected to an electric machine and at least one accessory;

a third junction element.

The drive system according to an aspect the invention further comprises a free wheel which is connected to a non-rotating part of the engine arrangement in the mounted position, the third junction element being configured to be coupled to the free wheel in a first operating phase of the drive system. In the first operating phase, the free wheel is configured such that when the third junction element exerts torque on the free wheel in one direction, the free wheel is in an engaged state and stops the rotation of the third junction element, and when the third junction element exerts torque on the free wheel in the opposite direction, the free wheel is in a free state and allows rotation of the third junction element.

In other words, the gear reduction mechanism is designed such that when the first junction element is receiving torque from the second junction element in the first operating phase, the third junction element exerts torque on the free wheel in one direction, the free wheel then being in an engaged state, and such that when the first junction element is generating a positive torque, the third junction element exerts torque on the free wheel in the opposite direction, the free wheel then being in a free state.

The mounted position means the position in which the drive system is installed within the engine arrangement and can be operated.

The "free state" of the free wheel corresponds to the configuration in which the free wheel disengages a drive member, that is connected to the free wheel or that is part of the free wheel, from a driven member, that is connected to the free wheel or that is part of the free wheel, while in the "engaged state" of the free wheel the drive member is engaged with the driven member by means of the free wheel, acting as a transmitting device. The drive member can be a driveshaft connected to the free wheel or a driveshaft of the free wheel and the driven member can be a driven shaft connected to the free wheel or a driven shaft of the free wheel.

In practice, the first operating phase corresponds to a starting phase of the engine, in which the electric machine rotates the engine up to start speed. In this starting phase, the free wheel provides a single way connection from the electric machine to the engine. Indeed:

At the beginning of the starting phase, the rotational speed of the engine is fairly low. Combustion is not established and engine needs torque to rotate. The free wheel, which receives through the third junction element a first torque oriented in one direction, is in an engaged state. This configuration allows transmission of torque from the electric machine to the engine;

When combustion is established, the engine accelerates sharply and the crankshaft provides torque. The free wheel, which receives through the third junction element a second torque oriented in an opposite direction, is in a free state and allows a free acceleration of the crankshaft. No torque, or only an insignificant torque, is transmitted from the engine to the electric machine or to the accessory. The electric machine speed is considered as being uncorrelated to crankshaft speed.

At the beginning of the starting phase, the reduction ratio between the rotational speeds of the engine and the electric machine is $Ra = R0 \times R1a$, wherein:

$R0$ is the reduction ratio between the electric machine and the accessory pulley. $R0$ can be around 4 for example;

$R1a$ is the reduction ratio between the accessory pulley and the crankshaft. $R1a$ can be around 4 for example.

As a result, $Ra$ can be around 16 (i.e. 120 rpm at the crankshaft corresponding to 1920 rpm at the electric machine).

However, owing to the free wheel, the invention prevents the torque transmission from the engine to the electric machine at the end of the starting phase, and therefore prevents the engine from damaging the accessory pulley and/or pieces connected to it, such as a belt or the electric machine.

A significant advantage of the invention is that the use of a free wheel allows an automatic and immediate disconnection of the engine and the electric machine as soon as the combustion engine torque becomes positive. As a result, response time problems are avoided.

Subsequently, the drive system can be brought in another operating phase, typically in a running phase, in which the reduction ratio between the rotational speeds of the engine and the electric machine is different from Ra. In this operating phase, said ratio is Rb=R0×R1b, with R1b=1.

Moreover, the invention provides a drive system having a simple and robust construction, which moreover is fairly compact and has a fairly low weight.

The third junction element can further be configured to be coupled to the accessory pulley, in a second operating phase. The second operating phase can correspond to a running phase, in which the engine is running and drives the electric machine and the accessory.

In the second operating phase, the drive system is preferably configured such that the engine may receive power from the electric machine. In this case, the electric machine may use electric energy stored in the battery to boost the engine for performance or fuel consumption purpose.

The third junction element may be moveable between a first position, in the first operating phase, in which, in the mounted position, it is coupled to the free wheel, and another position, in an operating phase different from the first one, in which, in the mounted position, it is uncoupled from the free wheel.

More specifically, the third junction element may be moveable between a first position, in the first operating phase, in which, in the mounted position, it is coupled to the free wheel, and a second position, in the second operating phase, in which, in the mounted position, it is coupled to the accessory pulley. In an embodiment, the drive system has a main axis and the third junction element is moveable in translation along said main axis.

According to an embodiment, the third junction element comprises first coupling members for coupling with the free wheel, and second coupling members for coupling with the accessory pulley. For example, the first and/or second coupling members can comprise dog teeth.

The third junction element can further be configured to take a third position where it is uncoupled from the free wheel and from the accessory pulley, in a third operating phase. This third operating phase can correspond to an electric phase, in which the engine is stopped and the electric machine drives the accessory. When the third junction element is uncoupled from the free wheel and from the accessory pulley, it is in a third position that can be axially intermediate between the first and second positions.

In an embodiment, that the gear reduction mechanism can comprise an epicyclic gearing including a sun gear, an annular gear, planet gears meshing with both the sun gear and the annular gear and supported by a planet carrier.

Each of the sun gear, the annular gear and the planet carrier may be connected to one of the junction elements.

The first junction element can be connected to the planet carrier, preferably can be part of the planet carrier, the second junction element can be connected to the sun gear, preferably can be part of the sun gear, and the third junction element can be connected to the annular gear, preferably can be part of the annular gear.

Besides, in the mounted position, the free wheel may be fixedly mounted on a carter of the engine arrangement.

According to a second aspect, the invention relates to an engine arrangement comprising an engine, an electric machine, at least one accessory, and an accessory pulley to which the electric machine and the accessory are drivingly connected, and further comprising a drive system as previously described.

In practice, the at least one accessory can be one of: a water pump, an air conditioner compressor, a cooling fan.

The engine arrangement may further comprise at least one sensor for detecting the operating condition of the engine, a controller connected to said sensor and capable of controlling an actuator configured to allow coupling or uncoupling the third junction element of the gear reduction mechanism and the free wheel.

The actuator can be configured to move the third junction element of the gear reduction mechanism to place it in one of its first, second and third positions, depending on the detected engine operating condition. The operating condition of the engine can correspond to a current operating phase of the engine or to a desired operating phase of the engine, i.e. when the driver requires the engine to be started, stopped, or restarted.

According to a third aspect, the invention relates to a vehicle comprising an engine arrangement as previously described.

According to a fourth aspect, the invention relates to a method for operating an engine arrangement comprising an engine, an electric machine and at least one accessory, the electric machine and the accessory being drivingly connected to an accessory pulley, and a drive system comprising:

a gear reduction mechanism having at least three separate and rotatable junction elements, the rotation speeds of the junction elements being interdependent but not having a fixed ratio the ones relative to the others, the gear reduction mechanism joining the accessory pulley and an engine crankshaft via two junction elements of the gear reduction mechanism;

a free wheel which is connected to a non-rotating part of the engine arrangement and which can be coupled to the gear reduction mechanism via a third junction element of the gear reduction mechanism.

The method comprises the steps of:

a) detecting at least one parameter indicating if the engine is in a starting phase;

b) if the engine is in a starting phase, coupling the gear reduction mechanism to the free wheel;

c) in the starting phase, when the electric machine is starting the engine, operating the free wheel in an engaged state;

d) in the starting phase, when the engine has started and while the gear reduction mechanism is still coupled to the free wheel, operating the free wheel in a free state.

In other words, in step c), the gear reduction mechanism is coupled to the non-rotating part via the free wheel, and the system configuration is such that it allows transmission of torque from the electric machine to the engine. Subsequently, in step d), the gear reduction mechanism is uncoupled from the non-rotating part.

The use of the free wheel allows a very reactive control of the drive system and therefore improves the engine arrangement robustness and reliability.

In an embodiment:

step a) consists in or comprises detecting at least one parameter indicating if the engine is in a starting phase, a running phase or an electric phase, respectively; and step b) consists in or comprises controlling the drive system to place the junction element of said gear reduction mechanism coupled to the free wheel if the engine is in a starting phase, coupled to the accessory pulley if the engine is in a running phase, or free from both the free wheel and the accessory pulley if the engine is in an electric phase.

In an embodiment, the drive system comprises an epicyclic gearing as the gear reduction mechanism, the epicyclic gearing including a sun gear, an annular gear, planet gears meshing with both the sun gear and the annular gear and supported by a planet carrier, the planet carrier being connected to the engine crankshaft and the sun gear being connected to the accessory pulley. Besides, step b) of the method consists in or comprises controlling the position of the annular gear relative to the free wheel or to the accessory pulley such that it can be coupled to the free wheel if the engine is in a starting phase, coupled to the accessory pulley if the engine is in a running phase, or uncoupled from both the free wheel and the accessory gear if the engine is in an electric phase.

The reduction ratio between the rotational speeds of the accessory pulley and the crankshaft can be:

R1b in the running phase, with R1b being substantially 1;
R1a in the starting phase, with R1a≠R1b, R1a being for example around 4.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a perspective view of a vehicle comprising an engine arrangement according to an embodiment of the invention;

FIG. 2a is a schematic front view of the engine arrangement in a starting phase;

FIG. 2b is a drawing of the kinematic connections between the various components of the engine arrangement, in the starting phase;

FIG. 2c is partial cross section of the engine arrangement, in the starting phase;

FIG. 3a, 3b, 3c are views similar to FIG. 2a, 2b, 2c, respectively, when the engine arrangement is in a running phase;

FIG. 4a, 4b, 4c are views similar to FIG. 2a, 2b, 2c, respectively, when the engine arrangement is in an electric phase.

DETAILED DESCRIPTION

Figure 3C:
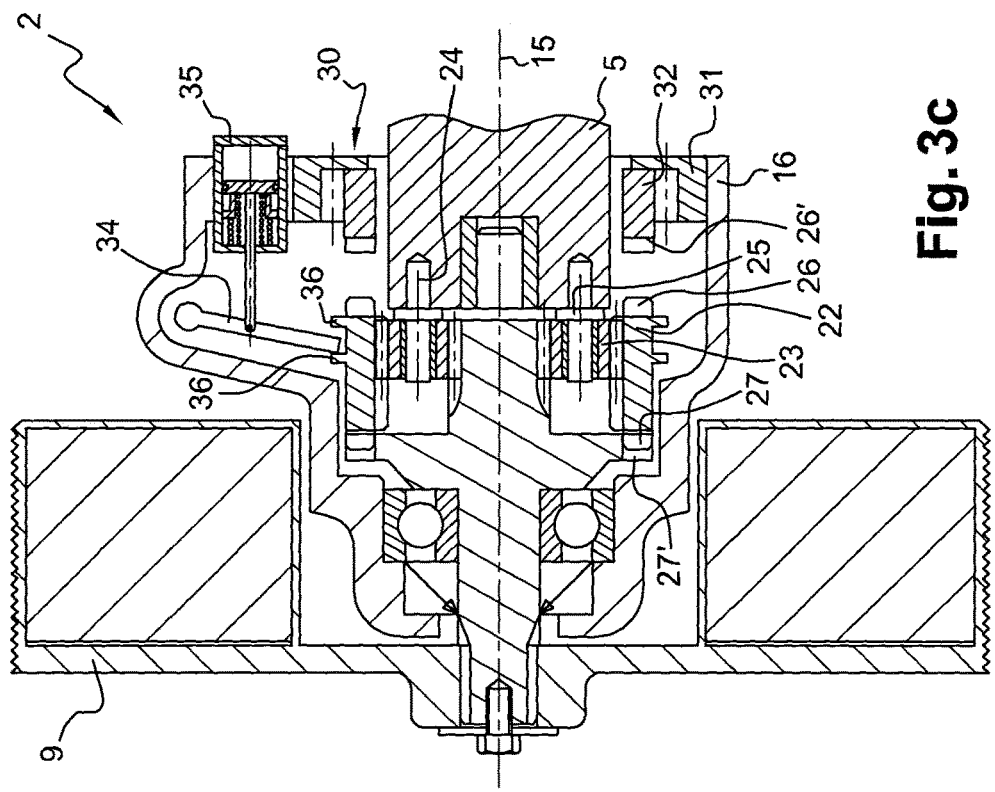

The invention relates to a drive system 1 for an engine arrangement 2 of a vehicle 3, an example of which is illustrated in FIG. 1.

In the illustrated embodiment, the vehicle 3 comprises a cab and can comprise a cargo body (not shown). The engine arrangement 2 may be located in front of the cab, below the seats. Although the vehicle illustrated in FIG. 1 is a truck, the invention is not restricted to this particular vehicle, but may also be used in other vehicles.

The engine arrangement 2 comprises an engine 4 having a crankshaft 5, an electric machine 6 that can be operated either in a motor mode or in generator mode, and at least one accessory 7. This accessory 7 can be for example a water pump, an air conditioner compressor, a cooling fan etc. In FIGS. 2a-b, 3a-b and 4a-b, the engine arrangement 2 comprises two accessories 7, 7'. The engine arrangement 2 further comprises a battery 8 connected to the electric machine 6, and an accessory pulley 9.

The electric machine 6, the accessory/accessories 7, 7' and the accessory pulley 9 are drivingly connected, typically through a belt 10 received by the accessory pulley 9 and pulleys 6a, 7a, 7'a connected respectively to the electric machine 6 and the accessory/accessories 7, 7'.

The drive system 1 of the engine arrangement 2 joins the accessory pulley 9 and the engine crankshaft 5. As a result, rotation can be transmitted from the electric machine 6 to the engine 4 and the accessory 7, and from the engine 4 to the electric machine 6 and the accessory 7, by means of the drive system 1, belt 10 and pulleys 9, 6a, 7a, 7'a. In particular, the accessory 7 is configured to be driven by one of the electric machine 6 and the engine 4.

The drive system 1 has a main axis 15 which can also be the axis of the engine crankshaft 5 and of the accessory pulley 9.

The drive system 1 comprises a gear reduction mechanism which, in the illustrated embodiment, is an epicyclic gearing 20. The epicyclic gearing 20 includes a sun gear 21 centred on axis 15, an annular gear 22 also centred on axis 15, and planet gears 23 meshing with both the sun gear 21 and the annular gear 22. The planet gears 23 have each an axis 24, and they are all supported by a planet carrier 25. The sun gear 21 is pivotally mounted to a carter 16 of the engine arrangement 2 and is connected to the accessory pulley 9. The planet carrier 25 is connected to the engine crankshaft 5.

The drive system 1 further comprises a free wheel 30 which is fixedly mounted to the carter 16, coaxially with axis 15. In the illustrated embodiment, the free wheel 30 comprises an outer cylinder 31 fixedly mounted inside the carter 16, and an inner part 32. The inner part 32 can freely rotate around axis 15 with respect to the outer cylinder 31 in one direction—which corresponds to a "free" state of the free wheel 30—while the inner part 32 cannot rotate around axis 15 with respect to the outer cylinder 31 in the opposite direction—which corresponds to an "engaged" state of the free wheel 30. Several embodiments can be envisaged for the free wheel 30.

The annular gear 22 can be moved along the axis 15 between:

a first position (FIGS. 2a-c) in which it is coupled to the free wheel 30;

and a second position (FIGS. 3a-c) in which it is coupled to the accessory pulley 9.

To that end, coupling members such as dog teeth can be provided on the parts to be coupled. More specifically, the annular gear 22 can comprise first coupling members 26 for coupling with corresponding coupling members 26' arranged on the free wheel 30, and second coupling members 27 for coupling with corresponding coupling members 27' arranged on the accessory pulley 9.

Besides, the annular gear 22 can be moved to a third position (FIGS. 4a-c), intermediate between the first and second positions along the axis 15, in which the annular gear 22 is uncoupled from the free wheel 30 and from the accessory pulley 9.

Preferably, in each of said three positions, the annular gear 22 remains meshed with the planet gears 23.

In order to move the annular gear 22, the engine arrangement 2 comprises an actuator 33. In the exemplary embodiment shown in FIGS. 2c, 3c and 4c, the actuator 33 includes a rod 34 pivotally mounted on the carter 16 and connected to an actuating cylinder 35. An end of the rod 34 cooperates with the annular gear 22. For example, said end of the rod 34 can be located between two radially outwardly extending walls 36. Thus, the actuating cylinder 35 can make the rod 33 pivot, which results in the rod 34 pushing the annular gear 22 axially either towards the accessory pulley 9 or towards the free wheel 30.

The engine arrangement 2 further comprises at least one sensor 37 for detecting an operating condition of the engine 4, and a controller 38 connected to said sensor 37 and capable of controlling the actuator 33. Depending on the detected engine operating condition, the actuator 33 is controlled to move the annular gear 22 to place it in one of its first, second and third positions.

Reference is now made to FIGS. 2a-2c which show the engine arrangement 2 in a starting phase.

When the driver wants to start the vehicle 3, he/she generally turns a key or switches on an ignition switch. As a result, the battery 8 powers the electric machine 6 to start it.

In an embodiment, the first position, i.e. when the annular gear 22 is coupled to the free wheel 30, is the default position. For example, a spring can be used to maintain the annular gear 22 in the first position when the controller 38 does not control the actuator 33 to place the annular gear 22 in another position. In a variant, the information "start the vehicle" is detected by the sensor 37 and transmitted to the controller 38 which controls the actuator 33 so that it places the annular gear 22 in the first position.

In this starting phase, the accessory 7 is driven by the electric machine 6. Moreover, the electric machine 6 drives the accessory pulley 9 which in turn rotates the sun gear 21. As the annular gear 22 is coupled to the free wheel 30 which is configured to be in the engaged state at the beginning of the starting phase, the annular gear 22 does not turn, and the planet gears 23 turn about the main axis 15, therefore transmitting rotating movement to the crankshaft 5.

In the starting phase, the gear reduction system—i.e. the epicyclic gearing 20—links the rotation of the electric machine 6 with the rotation of the engine crankshaft 5, with a reduction ratio $Ra=R0 \times R1a$ between the rotational speeds of the engine 4 and the electric machine 6. For example, Ra can be around 16 with R0 around 4 and R1a around 4.

When combustion is established, engine 4 provides torque, and therefore crankshaft 5 accelerates sharply. As the direction of the torque transmitted in the annular gear 22 changes, this automatically leads to the free wheel 30 transiting to its free state.

When the free wheel 30 is in its free state, even if the annular gear 22 remains coupled to the free wheel 30, no torque or only an insignificant torque is transmitted from the engine 4 to the electric machine 6. This prevents severe stress in the belt 10 and other parts.

Figure 3B:
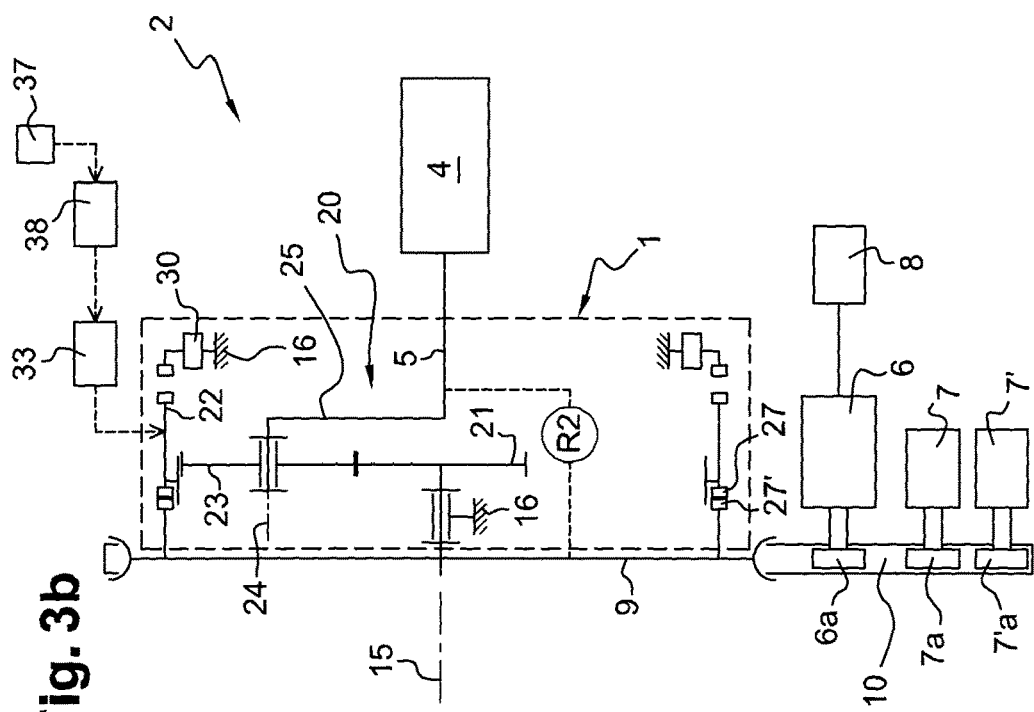

When the sensor 37 detects that the engine 4 has been started, the controller 38 controls the actuator 33 so that it places the annular gear 22 in the second position, i.e. coupled to the accessory pulley 9. The engine arrangement 2 is then in a running phase, as shown in FIGS. 3a-3c. Some embodiments could require speed synchronization between the electric machine 6 and the engine 4 to ease meshing.

In this running phase (i.e. normal driving conditions), the engine 4 is running. The engine 4 is then capable of driving the accessory 7, and also the electric machine 6 so that said electric machine 6 can charge the battery 8. In the same way, the electric machine 6 can be put in motor mode, providing additional torque to accessory 7 and crankshaft 5 by consuming energy stored in battery 8.

More precisely, the crankshaft rotation leads to the rotation of the planet gears 23 about the main axis 15 and to the rotation of the accessory pulley 9 which is coupled to the annular gear 22.

In the running phase, the gear reduction system—i.e. the epicyclic gearing 20—links the rotation from the electric machine 6 toward the engine crankshaft 5, with a reduction ratio $Rb=R0 \times R1b$ between the rotational speeds of the electric machine 6 and the engine 4. $R1b=1$, and thus Rb is different from Ra. For example, Rb can be in the range of 2 to 5, for example around 4.

From the running phase, the combustion engine 4 can be temporarily useless, for example if the vehicle is stopped in a traffic jam or at a traffic light. Then, in order to save fuel, the engine arrangement 2 automatically stops the engine 4, before it is restarted in response to a signal.

Figure 4C:
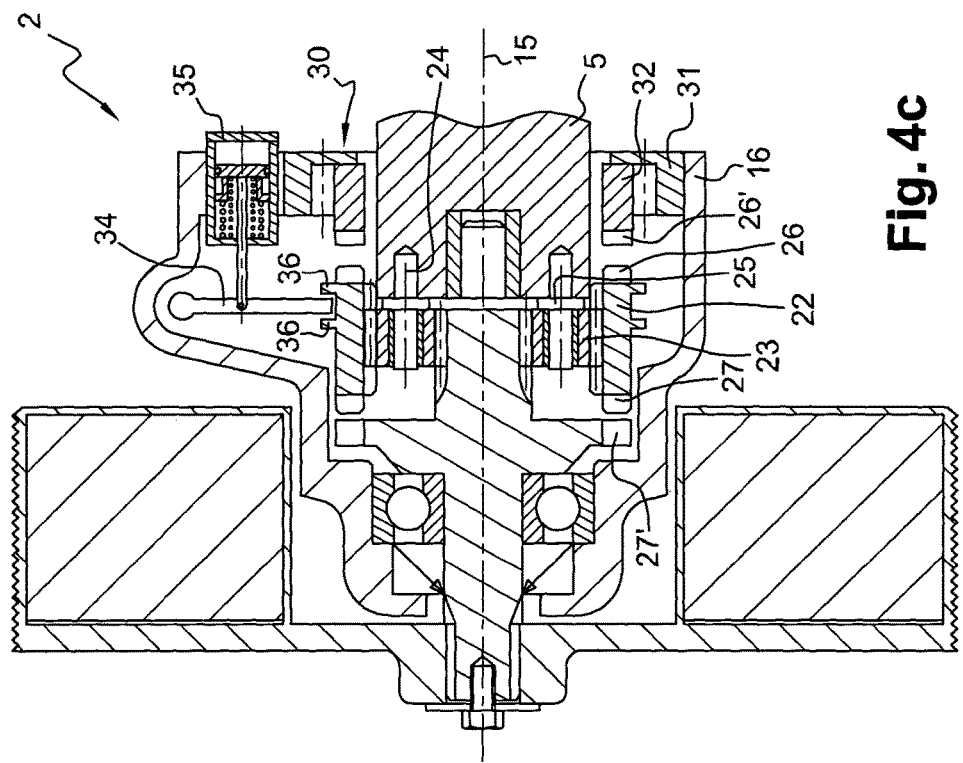
Figure 4B:
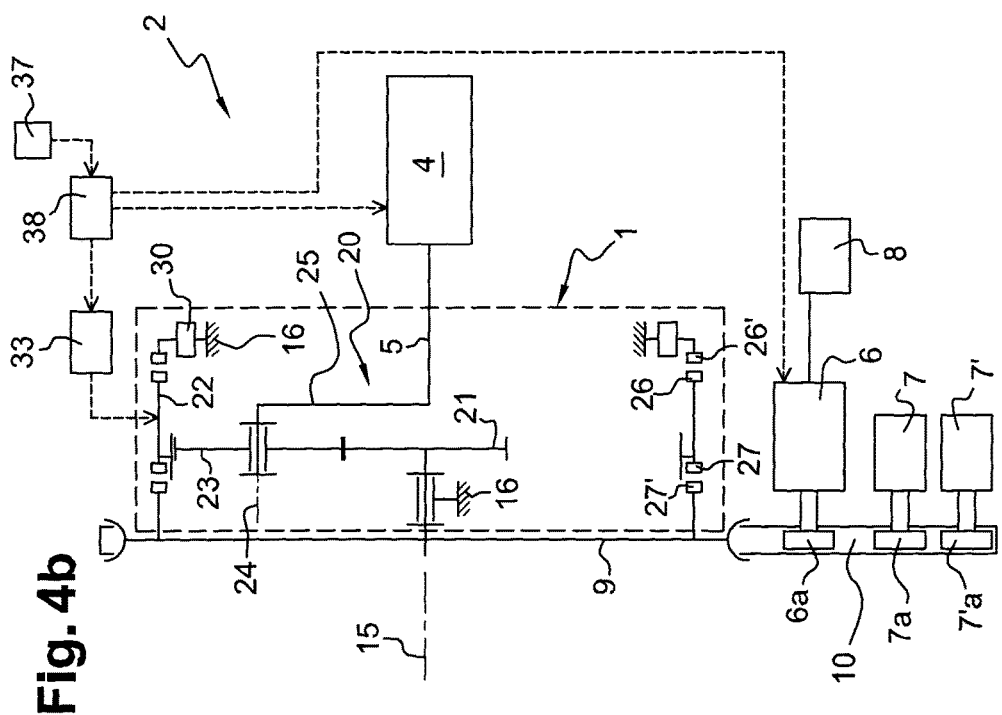

The sensor 37 is configured to detect that the engine 4 has been stopped. The controller 38 then controls the actuator 33 so that it places the annular gear 22 in the third position, i.e. uncoupled from the free wheel 30 and from the accessory pulley 9. The engine arrangement 2 is then in an electric phase (or "electrically driven accessory phase"), as shown in FIGS. 4a-4c.

Moreover, the controller 38 stops the engine 4 and starts the electric machine 6.

Thus, the electric machine 6 drives the accessory 7 and rotates the accessory pulley 9, which in turn rotates the sun gear 21 and planet gears 23. As the annular gear 22 is not coupled to the free wheel 30 or to the accessory pulley 9, the rotation of the planet gears 23 results in the free rotation of the annular gear 22, that is to say without the application of a resistive torque on the annular gear 22. Crankshaft speed and pulley speed are un-correlated.

Thus, the electric machine 6 can be rotationally disconnected from the engine 4, and the accessory 7 can be driven even if the engine 4 is stopped.

In a same way, the electric phase can be selected while engine 4 is running to reduce fuel consumption by having a more efficient electric phase.

From the electric phase, the controller 38 can calculate a need to be in another mode:

In order to restart the engine 4, the controller 38 brings the annular gear 22 back to the first position, so that the electric machine 6 can restart the engine 4. This movement can be done passively in case a spring is provided to define a default position as previously explained.

In order to switch from the electric phase to the running phase, the controller 38 brings the annular gear 22 in the second position. Some embodiments could require speed synchronization between the electric machine 6 and the engine 4 to ease meshing.

It is to be understood that the present invention is not limited to the embodiments described above and illustrated in the drawings; rather, the skilled person will recognize that many changes and modifications may be made within the scope of the appended claims.

The invention claimed is:

1. A drive system for an engine arrangement, the drive system comprising a gear reduction mechanism having at least three separate and rotatable junction elements, the rotation speeds of the junction elements being interdependent but not having a fixed ratio the ones relative to the others, and wherein, in the mounted position, among the junction elements:

a first junction element is connected to an engine crankshaft;

a second junction element is connected to an accessory pulley which is drivingly connected to an electric machine and at least one accessory;

a third junction element;

a free wheel which is connected to a non-rotating part of the engine arrangement in the mounted position, and in that the third junction element is configured to be coupled to the free wheel in a first operating phase of the drive system, wherein, in the first operating phase, the free wheel is configured such that when the third junction element exerts torque on the free wheel in one direction, the free wheel is in an engaged state and stops the rotation of the third junction element, and when the third junction element exerts torque on the free wheel in the opposite direction, the free wheel is in a free state and allows rotation of the third junction element, and wherein the third junction element is further configured to be coupled to the accessory pulley, in a second operating phase.

2. The drive system according to claim 1, wherein the third junction element is moveable between a first position, in the first operating phase, in which, in the mounted position, the third junction element is coupled to the free wheel, and another position, in an operating phase different from the first one, in which, in the mounted position, the third junction element is uncoupled from the free wheel.

3. The drive system according to claim 2, wherein the drive system has a main axis and in that the third junction element is moveable in translation along the main axis.

4. The drive system according to claim 1, wherein the third junction element is moveable between a first position, in the first operating phase, in which, in the mounted position, the third junction element is coupled to the free wheel, and a second position, in the second operating phase, in which, in the mounted position, it is coupled to the accessory pulley.

5. The drive system according to claim 1, wherein the third junction element comprises first coupling members for coupling with the free wheel, and second coupling members for coupling with the accessory pulley, the first and/or second coupling members comprising for example dog teeth.

6. The drive system according to claim 1, wherein the third junction element is further configured to take a third position where the third junction element is uncoupled from the free wheel and from the accessory pulley, in a third operating phase.

7. The drive system according to claim 1, wherein the gear reduction mechanism comprises an epicyclic gearing including a sun gear, an annular gear, planet gears meshing with both the sun gear and the annular gear and supported by a planet carrier.

8. The drive system according to claim 7, wherein each of the sun gear, the annular gear and the planet carrier is connected to one of the junction elements.

9. The drive system according to claim 7, wherein the first junction element is connected to the planet carrier, the second junction element is connected to the sun gear, and the third junction element is connected to the annular gear.

10. The drive system according to claim 1, wherein, in the mounted position, the free wheel is fixedly mounted on a carter of the engine arrangement.

11. An engine arrangement comprising an engine, an electric machine, at least one accessory, and an accessory pulley to which the electric machine and the accessory are drivingly connected, and the drive system according to claim 1.

12. The engine arrangement according to claim 11, wherein the at least one accessory is one of: a water pump, an air conditioner compressor, a cooling fan.

13. The engine arrangement according to claim 11, comprising at least one sensor for detecting the operating condition of the engine, a controller connected to the sensor and capable of controlling an actuator configured to allow coupling or uncoupling the third junction element of the gear reduction mechanism and the free wheel.

14. The engine arrangement according to claim 13, wherein the third junction element is moveable between a first position, in the first operating phase, in which, in the mounted position, the third junction element is coupled to the free wheel, and a second position, in the second operating phase, in which, in the mounted position, the third junction element is coupled to the accessory pulley and the third junction element is further configured to take a third position where the third junction element is uncoupled from the free wheel and from the accessory pulley, in a third operating phase, the actuator is configured to move the third junction element of the gear reduction mechanism to place it in one of its first, second and third positions, depending on the detected engine operating condition.

15. A vehicle comprising the engine arrangement according to claim 11.

16. A method for operating an engine arrangement comprising an engine, an electric machine and at least one accessory, the electric machine and the accessory being drivingly connected to an accessory pulley, and a drive system comprising:

a gear reduction mechanism having at least three separate and rotatable junction elements, the rotation speeds of the junction elements being interdependent but not having a fixed ratio the ones relative to the others, the gear reduction mechanism joining the accessory pulley and an engine crankshaft via two junction elements of the gear reduction mechanism;

a free wheel which is connected to a non-rotating part of the engine arrangement and which can be coupled to the gear reduction mechanism via a third junction element of the gear reduction mechanism;

the method comprising the steps of:

detecting at least one parameter indicating if the engine is in a starting phase;

when the engine is in a starting phase, coupling the gear reduction mechanism to the free wheel;

in the starting phase, when the electric machine is starting the engine, operating the free wheel in an engaged state;

in the starting phase, when the engine has started and while the gear reduction mechanism is still coupled to the free wheel, operating the free wheel in a free state; and coupling the third junction element to the accessory pulley in a twining phase.

17. The method according to claim 16, wherein:

the step of detecting at least one parameter indicating if the engine is in the starting phase comprises detecting at least one parameter indicating if the engine is in the starting phase, the running phase, or an electric phase, respectively; and controlling the drive system to place the junction element of the gear reduction mechanism coupled to the free wheel when the engine is in the starting phase, coupled to the accessory pulley when the engine is in the running phase, or free from both the free wheel and the accessory pulley when the engine is in the electric phase.

18. The method according to claim 17, wherein the drive system comprises an epicyclic gearing as the gear reduction mechanism, the epicyclic gearing including a sun gear, an annular gear, planet gears meshing with both the sun gear and the annular gear and supported by a planet carrier, wherein the planet carrier is connected to the engine crankshaft and the sun gear is connected to the accessory pulley.

19. The method according to claim 17, wherein the reduction ratio between the rotational speeds of the accessory pulley and the crankshaft is:
R1b in the running phase, with R1b being substantially 1;
R1a in the starting phase, with R1a≠R1b, R1a being for example around 4.

* * * * *